(12) United States Patent
Greverie et al.

(10) Patent No.: US 11,916,300 B2
(45) Date of Patent: Feb. 27, 2024

(54) MULTI-PANEL ARRAY ANTENNA (71) Applicant: THALES, Courbevoie (FR)

(72) Inventors: Wilfried Greverie, Limours (FR); Jean-Pierre Marcy, Limours (FR); Ronan Moulinet, Limours (FR)

(73) Assignee: THALES, Courbevoie (FR)

( * ) Notice: Subject to any disclaimer, the term of this patent is extended or adjusted under 35 U.S.C. 154(b) by 200 days.

(21) Appl. No.: 17/628,136

(22) PCT Filed: Jul. 8, 2020

(86) PCT No.: PCT/EP2020/069293
§ 371 (c)(1),
(2) Date: Jan. 18, 2022

(87) PCT Pub. No.: WO2021/008977
PCT Pub. Date: Jan. 21, 2021

(65) Prior Publication Data
US 2022/0271444 A1    Aug. 25, 2022

(30) Foreign Application Priority Data

Jul. 18, 2019 (FR) .................................... 1908058

(51) Int. Cl.
*H01Q 21/29* (2006.01)
*G01S 7/28* (2006.01)
(Continued)

(52) U.S. Cl.
CPC .......... *H01Q 21/29* (2013.01); *G01S 7/2813* (2013.01); *H01Q 3/26* (2013.01); *H01Q 21/22* (2013.01)

(58) Field of Classification Search
USPC ........................................................ 343/725
See application file for complete search history.

(56) References Cited

U.S. PATENT DOCUMENTS 4,596,986 A * 6/1986 Andrews .............. H01Q 3/2617
342/373
6,421,025 B1 * 7/2002 Drize ...................... H01Q 3/36
342/371
(Continued)

FOREIGN PATENT DOCUMENTS

EP          684660 A1 * 11/1995 .......... H01Q 3/2629
FR   2 784 803 A1      4/2000

*Primary Examiner* — Dimary S Lopez Cruz
*Assistant Examiner* — Brandon Sean Woods
(74) *Attorney, Agent, or Firm* — BakerHostetler (57) ABSTRACT

An array antenna includes a plurality of mechanically separate radiating panels arranged side-by-side, means for applying a shaping to the signals transmitted by the radiating elements of the panels and a device for managing the shaping of the signals, wherein the shaping coefficients correspond to a sum of at least: a shaping coefficient ($W_{co}$) making it possible to orient the maximum gain of the antenna in a given direction, and at least the opposite of a shaping coefficient ($W_c$) making it possible to orient the maximum gain of the antenna in the direction of a side lobe resulting from differences between the radiating panels of the array antenna. The method relates also to the associated transmission/reception method.

7 Claims, 8 Drawing Sheets

(51) Int. Cl.
*H01Q 3/26* (2006.01)
*H01Q 21/22* (2006.01)

(56) References Cited

U.S. PATENT DOCUMENTS

| | | | |
|---|---|---|---|
| 6,496,158 B1 | 12/2002 | Ksienski et al. | |
| 8,144,051 B2* | 3/2012 | Lok | G01S 7/36 342/368 |
| 2009/0135085 A1* | 5/2009 | Raby | H01Q 21/061 29/601 |
| 2015/0349434 A1* | 12/2015 | Yamashita | H01Q 21/0025 343/893 |

* cited by examiner

State of the art
FIG.2

MULTI-PANEL ARRAY ANTENNA

CROSS-REFERENCE TO RELATED APPLICATIONS

This application is a National Stage of International patent application PCT/EP2020/069293, filed on Jul. 8, 2020, which claims priority to foreign French patent application No. FR 1908058, filed on Jul. 18, 2019, the disclosures of which are incorporated by reference in their entirety.

FIELD OF THE INVENTION

The invention relates to the field of antenna devices, such as radar antennas, and relates more particularly to the production of an array antenna of large size.

BACKGROUND

Array antennas are antennas whose radiating face is composed of elementary radiating elements mounted on a mechanical structure. The separation between the radiating elements, or pitch of the radiating face, is fixed and is linked to the operating frequency band of the antenna. By modifying the phase of the signal transmitted or received by each of the radiating elements, it is possible to orient the maximum gain of the antenna in a given direction, which makes them particularly suitable for radar applications aiming to scan a geographic zone or to track the movement of an object over time (electronic scanning antennas). The radiation distribution function is composed of a main lobe, or beam, and side lobes. Modifying the amplitude of the elementary signals also makes it possible to control the quality of the beams formed and, advantageously, their side lobe levels.

Currently, the size of an array antenna is adjusted according to a precise operational requirement. Once the antenna is constructed, the antenna performance levels, such as its gain or its angular resolution, are fixed.

To increase performance, the only option is to develop a new antenna of a larger size comprising a greater number of radiating elements, which proves lengthy and costly. Furthermore, the difficulties and costs in transporting and deploying the antenna increase with its size.

There is therefore a need for a system that makes it possible to adapt the size of an array antenna to the operational requirement without requiring a new antenna to be manufactured. There is also a need for an array antenna of large size that can easily be transported and deployed.

SUMMARY OF THE INVENTION

To this end, the invention relates to an array antenna comprising:
- a plurality of mechanically separate radiating panels arranged side-by-side, each radiating panel comprising a plurality of radiating elements,
- means for applying a shaping to radio frequency signals transmitted by or received from each radiating element, and
- a device for managing the radio frequency signal shaping application means.

In the array antenna according to the invention, the shaping application means are configured to apply, to the signal transmitted by or received from each radiating element, a complex shaping coefficient corresponding to a sum of at least:

a shaping coefficient making it possible to orient the maximum gain of the antenna in a given direction, and at least the opposite of a shaping coefficient making it possible to orient the maximum gain of the antenna in the direction of a side lobe resulting from differences between the radiating panels of the array antenna.

Advantageously, the sum used to calculate the shaping coefficient applied to the radiating elements further comprises a calibration coefficient.

According to one embodiment, the shaping coefficient making it possible to orient the maximum gain of the antenna in a given direction is calculated from the desired pointing direction of the array antenna, from the frequency of the radio frequency signal, from the position of the radiating element considered within the array antenna, and from the total number of radiating elements of the array antenna.

According to one embodiment, the shaping coefficient making it possible to orient the maximum gain of the antenna in the direction of at least one side lobe resulting from differences between the radiating panels of the array antenna is calculated from the direction of said side lobe, from the frequency of the radio frequency signal, from the position of the radiating element considered within the array antenna, and from the total number of radiating elements of the array antenna.

Advantageously, the array antenna further comprises means for summing the signals received from each of the radiating elements and shaped.

The invention relates also to a method for the transmission or reception of a radio frequency signal for an array antenna comprising a plurality of radiating panels arranged side-by-side, each radiating panel comprising a plurality of radiating elements. The method then comprises the application of a complex shaping coefficient to the signal transmitted by or received from each radiating element. This complex shaping coefficient corresponds to a sum of at least:

a shaping coefficient making it possible to orient the maximum gain of the array antenna in a given direction, and at least the opposite of a shaping coefficient making it possible to orient the maximum gain of the antenna in the direction of a side lobe resulting from differences between the radiating panels of the array antenna.

Advantageously, the method further comprises a preliminary step of characterization of side lobes resulting from differences between the radiating panels of the array antenna.

BRIEF DESCRIPTION OF THE DRAWINGS

The invention will be better understood and other features and advantages will become more apparent on reading the following description, given in a nonlimiting manner, and from the attached figures.

Hereinbelow, when the same references are used in the figures, they denote the same elements.

DETAILED DESCRIPTION

The current radar antennas have dimensions which are adjusted according to an operational requirement and a precise threat density. Improving the gain or the precision of the antenna requires a new antenna of larger size to be manufactured.

The present invention proposes addressing these problems by producing an array antenna from array antennas of smaller dimensions. Thus, it is possible to dynamically adjust the size and the performance of the antenna according to the range requirement, by adding or eliminating antennas. This association of mechanically independent elements results in a radar of large size, that is powerful and that can easily be transported and deployed compared to the transportation and deployment of an antenna of equivalent size.

For this, initially, various array antenna association techniques are presented and their advantages/disadvantages discussed.

Figure 1A:
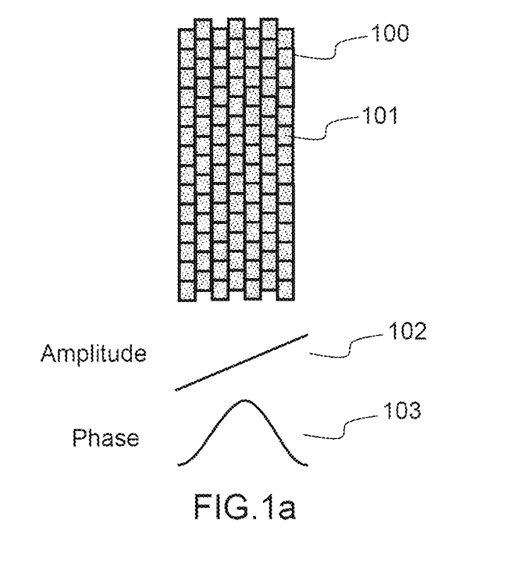
FIG. 1a schematically represents the radiating panel of a unitary array antenna.

FIG. 1a schematically represents the radiating panel of a unitary array antenna. It comprises a radiating panel 100 composed of a plurality of radiating elements 101 distributed according to a mesh of regular pitch. When used in transmission, the radio frequency (RF) signal to be transmitted is shaped then transmitted by each of the radiating elements. The shaping consists in modifying the phase of the RF signal, and, advantageously, its amplitude, for each of the radiating elements independently so as to orient the maximum gain of the antenna in the desired direction. When used in reception, the RF signal received from each radiating element is shaped so as to obtain the maximum gain of the antenna in a given direction. These operations are known as "beam forming".

The shaping of the beams is given by a control law, a phase law 103 and advantageously an amplitude law 102, to be applied to the RF signal to be transmitted or to be received on each of the radiating elements of the radiating panel. The phase-shift applied makes it possible to orient the maximum gain of the antenna in the desired direction. This phase-shift is constant between two consecutive radiating elements, and its value is directly linked to the wavelength of the RF signal, to the pitch of the radiating face and to the desired pointing of the beam. The amplitude control law makes it possible to concentrate the power at the center of the antenna, and therefore reduce the level of side lobes. The amplitude control law is therefore advantageous but not essential for pointing the beam from the antenna, most of the scanning array antennas known from the state of the art being driven only by a phase control in transmission.

Figure 1B:
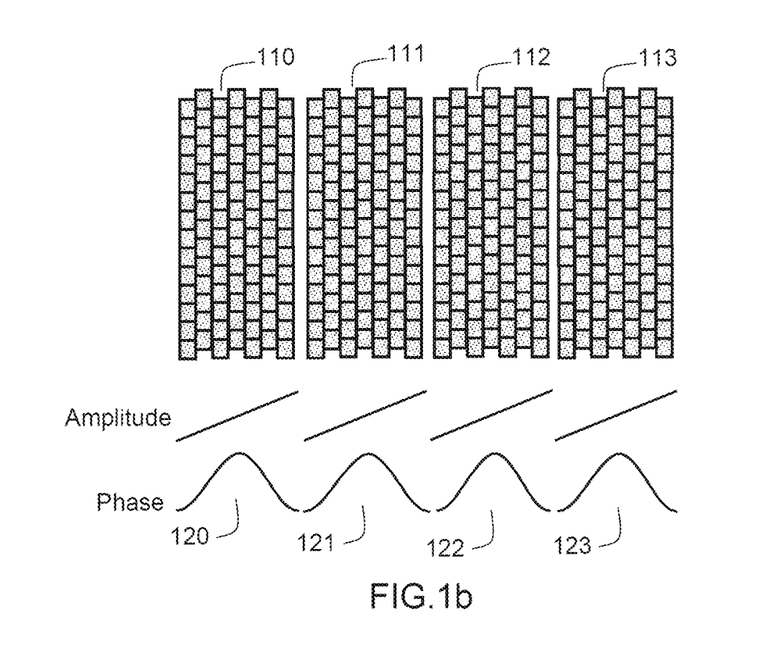
FIG. 1b represents a configuration of separate radiating panels, independent within the antenna arrays.

FIG. 1b represents a configuration of four unitary radiating panels that are separate, independent in the sense of antenna arrays. The radiating panels 110, 111, 112 and 113 all focus in the same angular direction, without taking account of the presence of neighboring panels. For this, the same control law 120, 121, 122, 123 is assigned to each of the radiating panels. This way, when used in transmission, the total signal transmitted is the recombination of each of the signals, which makes it possible to improve the transmission power. When used in reception, the signal received on each of the radiating panels can be summed in order to improve the signal-to-noise ratio.

However, the angular resolution is not improved with respect to the configuration of FIG. 1a. Furthermore, the transmissions of the different panels interfere, which generates gain losses and the appearance of the side lobes in particular for significant misalignments.

Figure 1C:
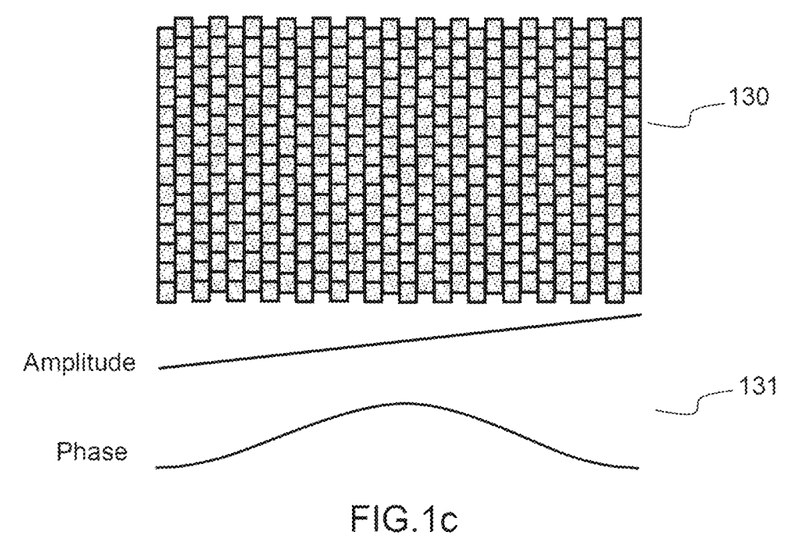
FIG. 1c represents a radiating panel for an array antenna produced from the contiguous association of four radiating panels of smaller size.

FIG. 1c represents a radiating panel 130 for an array antenna produced from the joined association of four radiating panels of smaller size, as represented in FIG. 1a. The control law 131 applied to the radiating elements is matched to the total surface of the radiating panel 130, via a centralized calculation of the phases, and advantageously amplitudes, of focusing to be applied. Thus, the angular resolution and the gain of the antenna are improved with respect to the configuration of FIG. 1a. However, this case is a theoretical case to be strived toward, in which the radiating panel produced from several joined radiating panels is continuous. In practice, the antennas have edges which make it impossible to obtain a perfectly joined array like that represented in FIG. 1c.

Figure 1D:
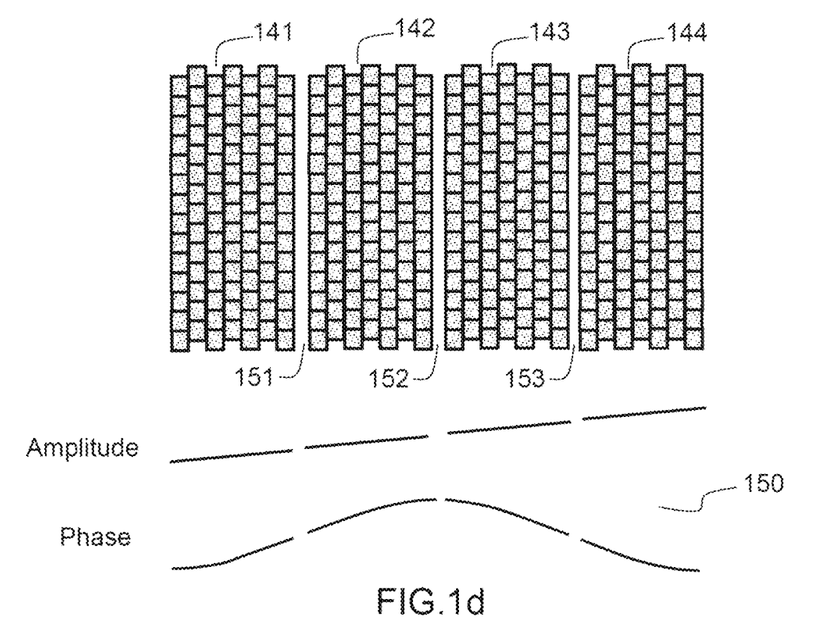
FIG. 1d represents a radiating panel for an array antenna produced from the separate association of four radiating panels of smaller size.

FIG. 1d represents a radiating panel for an array antenna produced from the separate association of four separate unitary panels 141, 142, 143 and 144, as represented in FIG. 1a. The control law 150 applied to the radiating elements is matched to the total surface of the radiating panel 130, via a centralized calculation of the focusing phases, and advantageously amplitudes, to be applied. However, since the radiating panels cannot be arranged contiguously because of their edges, the overall array antenna is not continuous. The gaps 151, 152 and 153 between radiating panels (translation on three axes) and their alignment (rotations on three axes) result in breaks in the total radiating face.

While the performance levels in terms of angular resolution and gain are improved over the configurations of FIGS. 1a and 1b, the breaks of the radiating face degrade the focusing of the beam. Indeed, the phase control law is calculated in such a way that the contribution of each radiating element interferes with that of the other radiating elements so as to orient the beam of the antenna. The gaps between the radiating panels are like absences of radiating elements, the contribution of which is necessary to the correct forming of the beam. The resulting beam is therefore degraded, with consequential gain losses in the direction targeted, a less good directivity and the appearance of side lobes.

The object of the present invention is to produce an array antenna from several radiating panels arranged side-by-side not contiguously, as in the example of FIG. 1d, and to modify the control law of the radiating elements so as to take account of the gaps and alignment differences between the various radiating panels in the forming of the beam. For this, the overall antenna is seen as corresponding to the sum of two radiating surfaces: a first radiating surface corresponding to all of the surface of the radiating panels (including the gaps between radiating panels), and a second surface corresponding to the gaps between the radiating panels. This second surface is equivalent to a virtual array of small radiating surfaces generating interferences which degrade the beam generated by the first surface. As long as the gaps between radiating panels are small in relation to the dimension of the latter (typically less than a few wavelengths) it is possible to evaluate the radiation pattern of the second surface, and to oppose it to the radiation pattern of the first surface to obtain an overall radiation pattern in which the level of the side lobes brought about by the non-joined nature of the radiating panels is reduced. This is possible by modifying the amplitude and phase coefficients of the signals transmitted to the radiating elements forming the overall radiating surface.

In the example of FIG. 1d, the radiating panels are arranged side-by-side horizontally, so as to increase the width of the overall array antenna, and thus improve the angular resolution in azimuth. They could however, equivalently, be arranged side-by-side vertically to improve the angular resolution in elevation, or on both axes.

Figure 2:
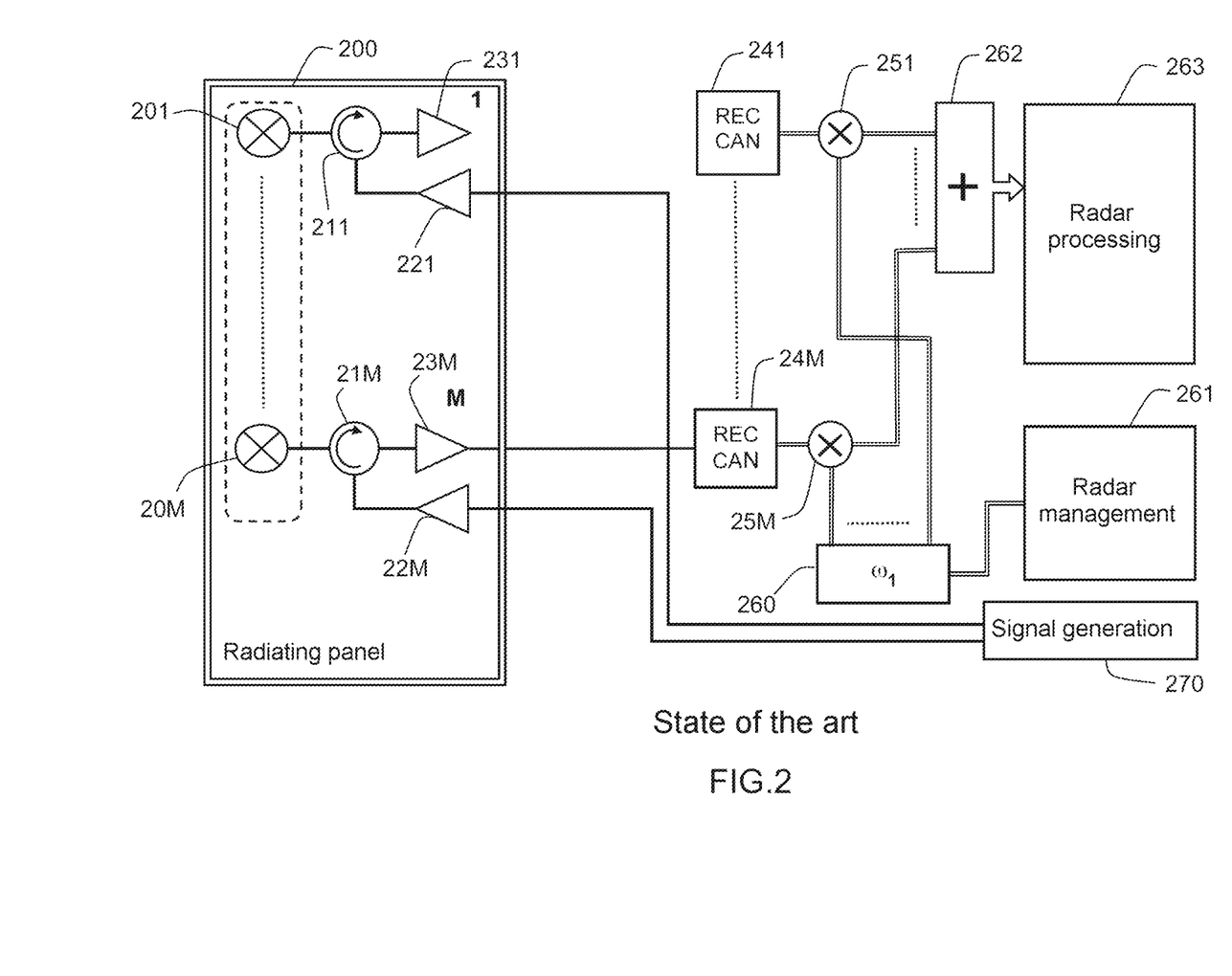
FIG. 2 represents the main elements of a unitary array antenna according to the state of the art.

FIG. 2 represents the main elements of a unitary array antenna according to the state of the art. In the terminology adopted, the expression "array antenna" encompasses both the radiating panels and the components necessary to implement beam forming processes. The array antennas presented hereinbelow by way of illustration are used in reception, because, for the radar applications, the RF signal is generally transmitted by using high-efficiency amplifiers, such as, for example, class C amplifiers, that do not allow amplitude variation in the signal transmitted. It is therefore in reception that the invention applies more fully, on the one hand for beams with low side lobe levels, and, on the other hand, because the control of the signals can be modulated in phase and in amplitude. However, the invention would apply identically for driving the beam in transmission.

The radiating panel 200 of FIG. 2 comprises M radiating elements 201 to 20M. A circulator 211 to 21M makes it possible to switch each radiating element between a transmission function in which it receives a signal to be transmitted and a reception function in which it receives an RF signal and transmits it to dedicated processing equipment.

When the antenna is used in transmission, the RF signal to be transmitted is generated by dedicated analog RF signal generation equipment 270, amplified by an amplification chain common to all the radiating elements or an amplification chain 221 to 22M specific to each radiating element, then transmitted by the radiating elements.

When the antenna is used in reception, the signal received on each of the radiating elements is transmitted to a low-noise amplifier 231 to 23M then digitized by an analog-to-digital convertor 241 to 24M. A shaping coefficient specific to each radiating element, corresponding ideally to a phase-shift and to an attenuation, is applied in 251 to 25M to the digital signal. The value of the phase-shift and of the attenuation is adjustable and is a function of the desired direction of the beam from the antenna. These coefficients are generally pre-calculated and stored in a table $\omega_1$ 260 comprising all the attenuation and phase-shift coefficients of the various radiating elements as a function of the direction of the beam from the antenna. The values of the table 260 are programmed as a function of the desired direction by a radar management device 261. Finally, the RF signals received from the various radiating elements and shaped are summed 262, then processed by the signal process algorithms 263 specific to the targeted application.

The arrangement shown in FIG. 2 is given by way of illustration, and can be adapted at the margin by the person skilled in the art without preventing the implementation of the invention. For example, it would be possible to reverse the position of the analog-digital convertors 241 to 24M and of the signal shaping devices 251 to 25M. In this case, the shaping is done on the analog signal by control nodes comprising attenuators and phase-shifters. Other adjustments will obviously become apparent, such as, for example:

limiting the control law to a phase law,
dedicating the antenna to the reception of an RF signal by eliminating the circulators 211, 21M and all the transmission part (270, 221, 22M),
applying the attenuations and phase-shifts $\omega_1$ to the transmission rather than to the reception, and potentially dedicating the antenna to the reception of an RF signal by eliminating the circulators 211, 21M and all the reception part (231, 23M, 241, 24M, 262, 263),
applying the attenuations and phase-shifts $\omega_1$ both to transmission and to reception.

The values of the table $\omega_1$ 260 are calculated theoretically from the number of radiating elements, from their respective positions, from the size and from the pitch of the radiating mesh, and from the operating frequency considered. Advantageously, they can be complemented by adjustment coefficients taking account of the imperfections of the radiation patterns of each radiating element and the imperfections linked to the structure of the radiating panel, these imperfections being characterized in the factory in a calibration phase. One standard method consists in performing field measurements close to the antenna panel to obtain, by back propagation (inverse Fourier transform calculation) the signal level produced for each radiating element and know the deviation from the theoretical signal distribution that gives the maximum focusing.

Figure 3:
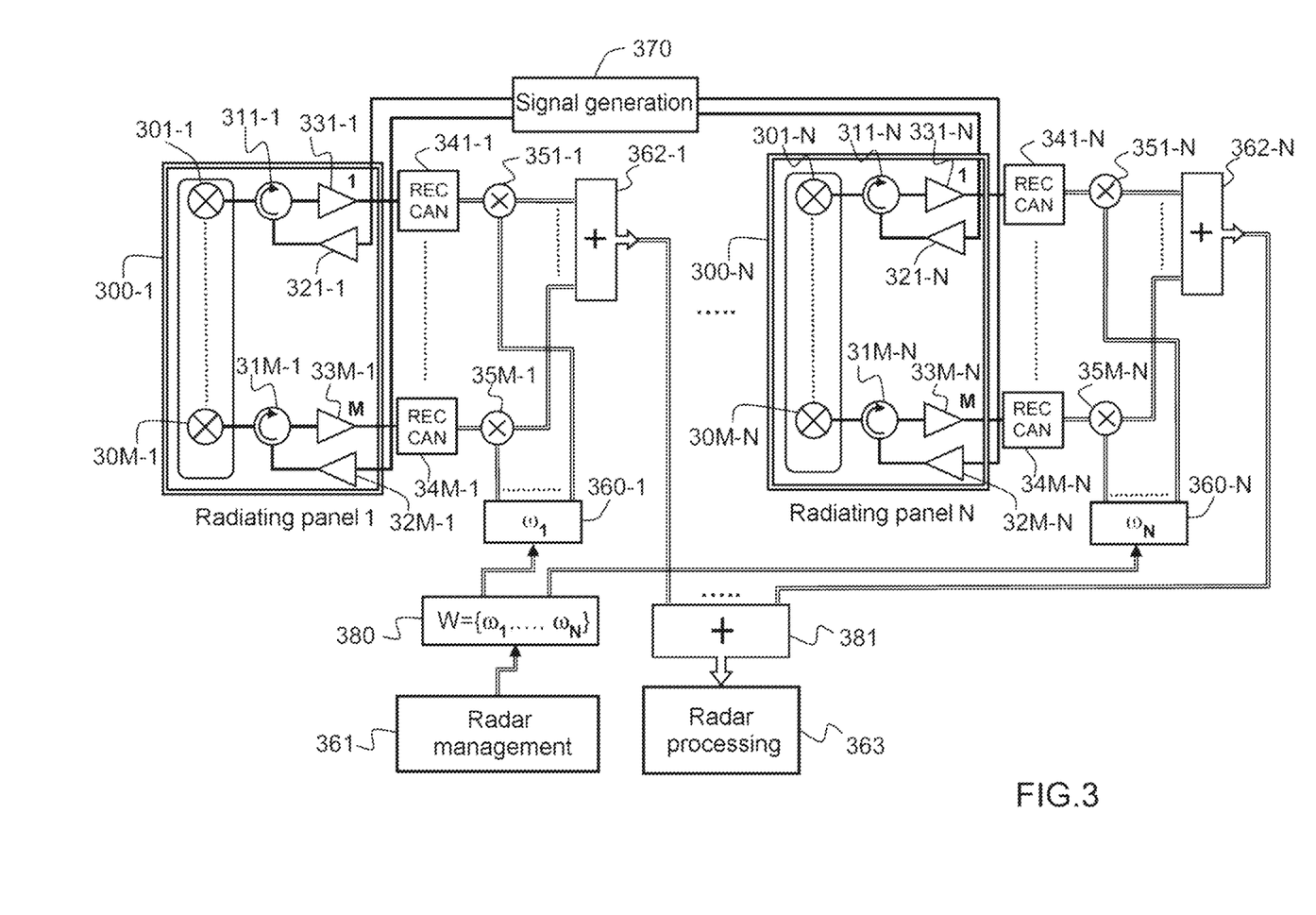
FIG. 3 represents the main elements of an array antenna according to an embodiment of the invention.

FIG. 3 represents the main elements of an array antenna according to an embodiment of the invention. This antenna comprises N radiating panels 300-1, 300-N as described in FIG. 2, linked to a centralized management device 361 of the control laws, as represented in FIG. 1d.

Each radiating panel therefore comprises M radiating elements 301-1, 30M-1, 301-N, 30M-N each linked to a circulator 311-1, 31M-1, 311-N, 31M-N that makes it possible to switch between transmission and reception.

To simplify the description, it has been assumed that the array antenna was composed of several radiating panels of strictly identical sizes. However, the invention would apply equivalently for an array antenna composed of radiating panels of different sizes. Given equal radiating surface, the results obtained would be comparable.

In transmission, the analog RF signal to be transmitted is generated by a device 370 and amplified by the amplification chains 321-1, 32M-1, 321-N, 32M-N.

In reception, the signals received from each radiating element are amplified by the low-noise amplifiers 331-1, 33M-1, 331-N, 33M-N, digitized by the analog-digital convertors 341-1, 34M-1, 341-N, 34M-N, then shaped. The table of coefficients $\omega_1$ 360-1 contains the attenuations and phase-shifts applied to each of the RF signals received from the radiating elements 351-1, 35M-1 of the antenna 1, while the table of coefficients $\omega_N$ 360-N contains the attenuations and phase-shifts applied to the RF signals received from the radiating elements 351-N, 35M-N of the antenna N. The signals are then summed by the summers 362-1 and 362-N.

The shaping coefficients $\omega_1$ and $\omega_N$ are supplied by a higher-level table 380, which comprises the tables of coefficients for one or more radiating panel configurations. A centralized radar management device 361 is responsible for calculating or selecting the tables of coefficients as a function of the radiating panel arrangement information, of the operating frequency and the orientation targeted for the beam from the antenna. This device generally takes the form of software embedded on a computation device such as a processor, a digital signal processor (better known by the acronym DSP), or a specialized circuit such as an ASIC (acronym for "application specific integrated circuit") or an FPGA (acronym for "field-programmable gate array").

Finally, the signals received from the various antennas are summed 381, then transmitted to radar processing software 363 for the implementation of the signal processing algorithms necessary to the targeted applications.

The multiple-radiating-panel array antenna structure represented in FIG. 3 is given by way of illustration, and can be adapted at the margin without compromising the very principle of the invention, for example by:
- shaping the RF signal transmitted by each radiating element,
- digitizing the signal after the shaping of the RF signals,
- limiting the antenna to transmission or reception,
- directly retrieving the shaping coefficients (attenuation and phase-shift) used in 351-1, 35M-1, 351-N and 35M-N in the table W 380,
- performing all the summings 362-1, 362-N and 381 in a single step.

The multiple-panel antenna according to the invention has the advantage that the control law of the weightings applied to the RF signals received from the various radiating elements takes account of all of the radiating face of the multiple-panel antenna, the operating frequency and the desired pointing direction, but also the imperfections due to the breaks in the radiating face caused by the gaps between radiating panels and their alignment variations.

Figure 4A:
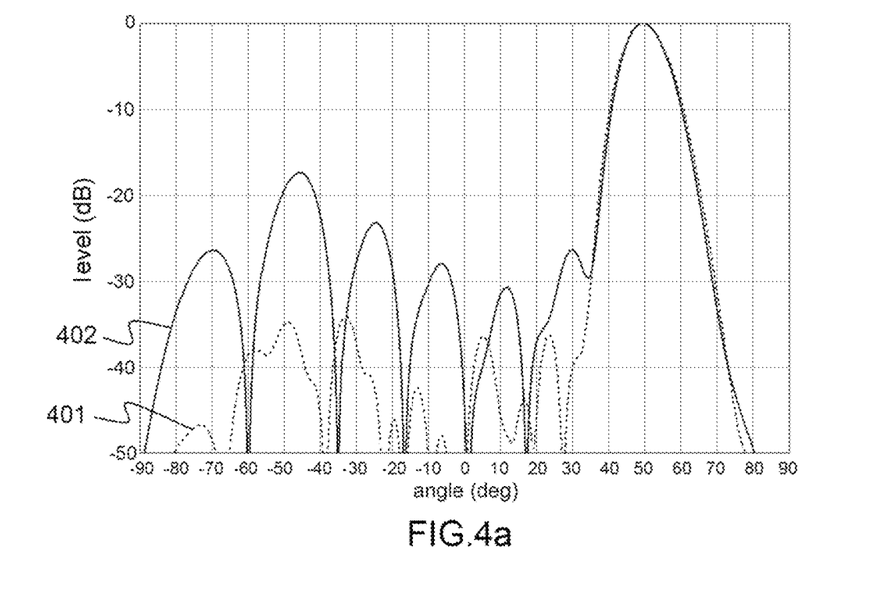
FIG. 4a compares the radiation pattern of an array antenna obtained from a separate array and from a joined array of radiating panels.

FIG. 4a represents, in dotted lines 401, the radiation pattern obtained by the implementation of an ideal joined array of radiating panels, as represented in FIG. 1c. The radiation pattern is represented therein by angles of between −90° and +90°. The main lobe, which corresponds to the pointing direction of the beam, points in the example to 50° azimuth. In the other directions, the transmissions are attenuated by at least 35 dB compared to the main lobe.

FIG. 4a represents also, by continuous lines 402, the radiation pattern obtained by the implementation of a separate array of radiating panels, as represented in FIG. 1d, without compensation of the interferences generated by the gaps between the panels. Side lobes, the level of which is approximately 20 dB to 30 dB below the level of the main lobe, appear for angles of approximately −70°, −45°, −25°, −5° and 30°. One of the aims of the invention is to reduce the level of or eliminate these side lobes, which are, here, approximately 10 to 20 dB higher than for the joined array.

For this, the beam of the overall pattern of the array antenna can be expressed as the equation (1) below:

$$F(\vec{k},\vec{k_0},f) = \sum_{n=1}^{N}\sum_{m=1}^{M}\left[W_c\left[\vec{K_P},\overrightarrow{(r^{(n)})_m},f\right]_{n,m} \cdot$$

$$W_{co}\left[\vec{k_0},\overrightarrow{(r^{(n)})_m},f\right]_{n,m} \cdot W\left[\vec{k},\overrightarrow{(r\_r^{(n)})_m},f\right]_{n,m} \cdot f(\vec{k})_{n,m}\right]$$

with:
N the number of radiating panels,
M the number of radiating elements per panel,
P the number of side lobes generated by the differences between the radiating panels,
$W_c[\vec{K_p},\overrightarrow{(r^{(n)})_m},f]_{n,m}$ the first term of the equation, corresponding to the shaping coefficients applied to the radiating element n, m to point the beam from the antenna in the direction of each of the side lobes, at the frequency f,
$W_c[\vec{k_0},\overrightarrow{(r^{(n)})_m},f]_{n,m}$ the second term of the equation, corresponding to the shaping coefficient applied to the radiating element n, m to point the beam from the antenna in the desired pointing direction for the main lobe, at the frequency f, $W[\vec{k},\overrightarrow{(r\_r^{(n)})_m},f]_{n,m}$ the third term of the equation, corresponding to the phase factor affecting the signal from the radiating elements, if applicable by a calibration coefficient, at the frequency f,
$f(\vec{k})_{n,m}$ the fourth term of the equation, corresponding to the elementary pattern formed by the radiating element n, m,
$\vec{k}$ represents a direction in space, with $$\vec{k} = \begin{pmatrix} u \\ v \\ w \end{pmatrix},$$

u, v and w being directions according to three axes of an orthonormal reference frame,
$\vec{k_0}$ represents the pointing direction of the main lobe of the array antenna,
f is the usage frequency of the array antenna,
$\vec{K_p}$ is a vector comprising the direction of each of the P side lobes generated by the differences between radiating panels,
$(r^{(n)})_m$ is the position of the radiating element m of the radiating panel n in the reference frame of the array antenna,
$\overrightarrow{(r\_r^{(n)})_m}$ is the position of each radiating element actually realized and expressed in an overall reference frame,
$f(\vec{k})_{n,m}$ is the elementary pattern of the radiating element n, m.

The first term of the equation, in $W_c[\vec{K_p},\overrightarrow{(r^{(n)})_m}]$, corresponds to the P shaping coefficients $\omega_c$ that have to be applied to each of the radiating elements to point the beam from the array antenna in each of the P directions $\vec{K_p}$ of the side lobes of the antenna, when a control law is considered that takes account of all of the array antenna i.e.

$$W_c[\vec{K_p},\overrightarrow{(r^{(n)})_m}] = [[\omega_c[\vec{K_p},\overrightarrow{(r^{(1)})_m}]_{1\ldots M}]^{<1>} \ldots [\omega[\vec{K_p}, \overrightarrow{(r^{(N)})_m}]_{1\ldots M}]^{<N>}].$$

For each direction $\vec{K_p}$, the corresponding shaping coefficient $\omega_c$ is obtained from the associated control law that makes it possible to point the beam from the array antenna in the direction of the side lobe considered, at the desired level. It is therefore a complex amplitude/phase coefficient.

The second term of the equation, in $W_{co}[\vec{k}_p, \overrightarrow{(r^{(n)})_m}]$, corresponds to the control law to be applied to the various antenna elements to point the beam from the array antenna in the desired direction, when a control law is considered that takes account of all of the array antenna. Then:

$$W_{co}[\vec{k}_0,\overrightarrow{(r^{(n)})_m}]=[[\omega_{co}[\vec{k}_0,\overrightarrow{(r^{(1)})_m}]_{1\ldots M}]^{<1>}\ldots[\omega_{co}[\vec{k}_0,\overrightarrow{(r^{(N)})_m}]_{1\ldots M}]^{<N>}].$$

with:
$\omega_{co}$ the shaping coefficient corresponding to the targeted direction.

The coefficient $\omega_{co}$ can therefore correspond to a phase-shift only, or advantageously be a complex amplitude/phase coefficient.

The third term of the equation, in $W[\vec{k}, \overrightarrow{(r\_r^{(n)})_m}]$, corresponds to the phase factor of the signal picked up by each radiating element to take account of the interferences between the radiating elements. This phase factor can contain a calibration coefficient generally obtained in a calibration phase performed during the manufacture of each radiating panel.

The fourth term of the equation, in $f(\vec{k})_{n,m}$, represents the elementary pattern of the radiating element n, m. It makes it possible to take account of the slight differences that may exist between the patterns of the various radiating elements, and therefore the effects of mutual couplings between radiating elements. It can be expressed as:

$$f(\vec{k})_{n,m}=E_{inc}[Mr_n(\overrightarrow{h(\vec{k},f)})_{n,m}]$$

with:
$E_{inc}$ the polarization of an incident planar wave,
$Mr_n$ a rotation matrix associated with the radiating element n.

To reduce the side lobes due to the presence of differences between the various radiating panels, the invention proposes applying to each of the radiating elements a complex shaping coefficient calculated on the principle of the subtraction in the known direction of each of the spurious lobes of a lobe of equivalent level equal to that of the spurious lobe. The knowledge of the spurious lobe is determined by the knowledge of the position of the elements of the overall array installed on its site of use. The coefficient of a radiating element is equal to the coefficient $\omega_0$, required to orient the maximum gain of the antenna in a given direction, minus the coefficients $\omega_c$ corresponding to the directions of the side lobes affected by the levels of the spurious side lobes. That way, the effect of the gaps between radiating panels is compensated and the level of the side lobes is reduced.

Advantageously, the phase and amplitude shaping coefficient applied to each radiating element takes account of the calibration coefficient taken into account in the W of the equation (1).

Figure 4B:
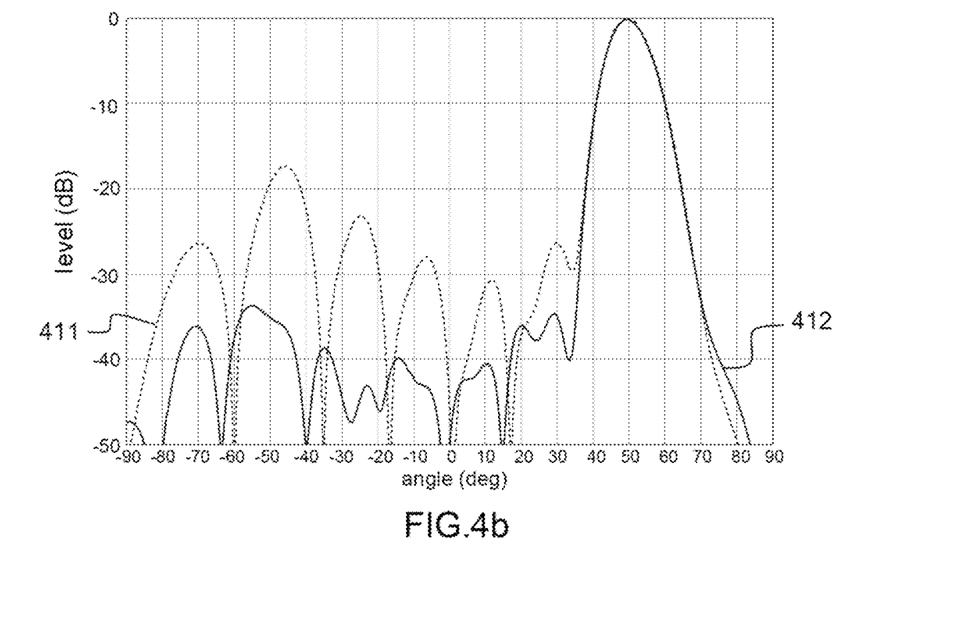
FIG. 4b compares the radiation pattern of an array antenna obtained from a separate array of radiating panels, with and without taking into account the interferences generated by the differences between radiating panels.

FIG. 4b represents, in dotted lines 411, the radiation pattern obtained by a separate array of radiating panels, as represented in FIG. 1d, without compensation of the interferences due to the gaps between the panels, corresponding to the radiation pattern 402 of FIG. 4a.

The radiation pattern 412, in solid lines, is obtained by the same separate array of radiating panels, after implementation of the compensation of the shaping coefficients described by the invention. It can be seen therein that the side lobes, at −70°, −45°, −25°, −5° and 30°, have been attenuated and are returned to levels comparable to those obtained for an ideal antenna composed of joined radiating panels, i.e. a reduction of 10 to 20 dB in the level of each of these side lobes.

The multiple-antenna radiating panel according to the invention therefore does indeed make it possible to reduce the level of side lobes generated by the differences between radiating panels. The number of side lobes generated by the gaps between radiating panels depends on the operating frequency and on the pointing direction. The number P of side lobes processed depends on their level and on the requirements concerning the directivity of the beam, and must therefore be evaluated in light of the operational requirements and the available computation power.

Figure 5A:
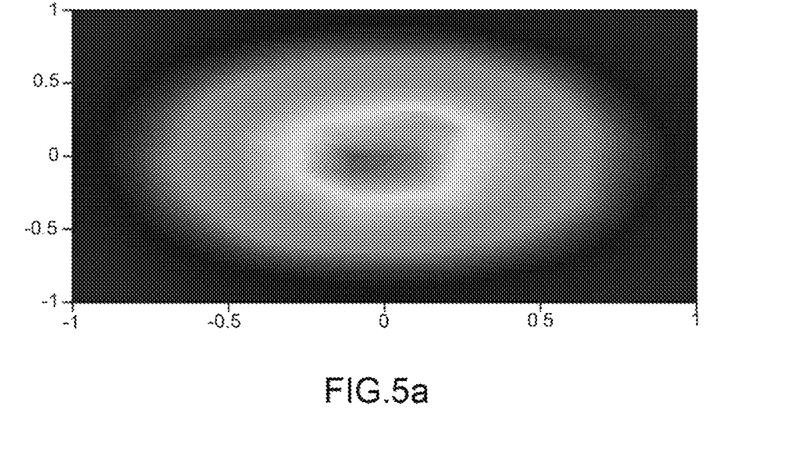
FIG. 5a represents the beam of an array antenna composed of a joined array of radiating panels.
Figure 5B:
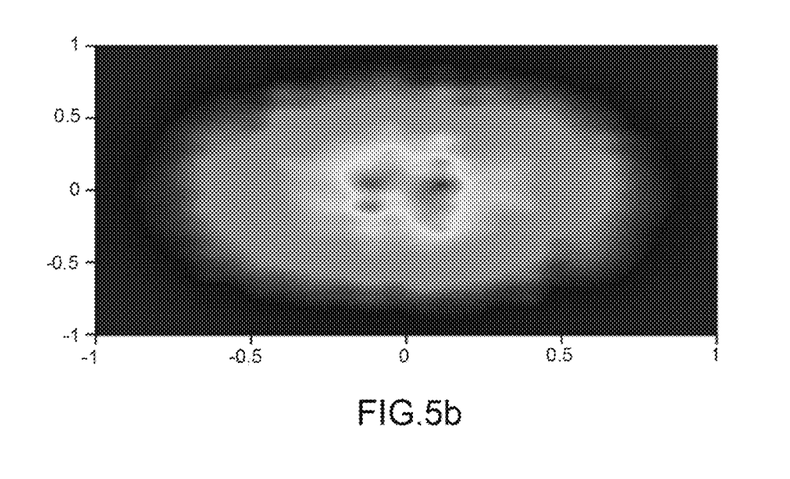
FIG. 5b represents the beam from an array antenna composed of a joined array of radiating panels when the shaping coefficients of the signals transmitted or received by the radiating elements are adjusted to take account of the interferences between radiating panels.

FIG. 5a represents the beam from an array antenna composed of an ideal joined array of radiating panels. The beam is well centered around the direction targeted. FIG. 5b represents the antenna beam transmitted by the same ideal joined array of radiating panels when the phase and amplitude control coefficients are modified to take account of the interferences generated by the gaps between the radiating panels. The beam is more diffuse than that of FIG. 5a. However, when transmitted from an antenna composed of a separate array of radiating panels, the beam tends toward that of FIG. 5a.

The object of the present invention relates also to a transmission or reception method implemented from an array antenna formed by multiple radiating panels. This method is represented in the form of a diagram in FIG. 6. It can be broken down into two parts:
a preliminary part 601 and 602 of characterization of the interferences generated by the relative arrangement of the radiating panels, and
an operational part 603 of transmission/reception of RF signals by taking account of the interferences characterized.

The two parts can be implemented independently. In fact, the first can be performed before the installation of the antenna for its use in the field of operation since the interferences generated are identical for two situations in which the number of radiating panels and their arrangement is similar. The characterization of the interferences can then be done during the installation of the antenna, previously, based on the radiating panels used to construct the array antenna, from other radiating panels of the same sizes, or even from software simulating the radiation of the array antenna.

Figure 6:
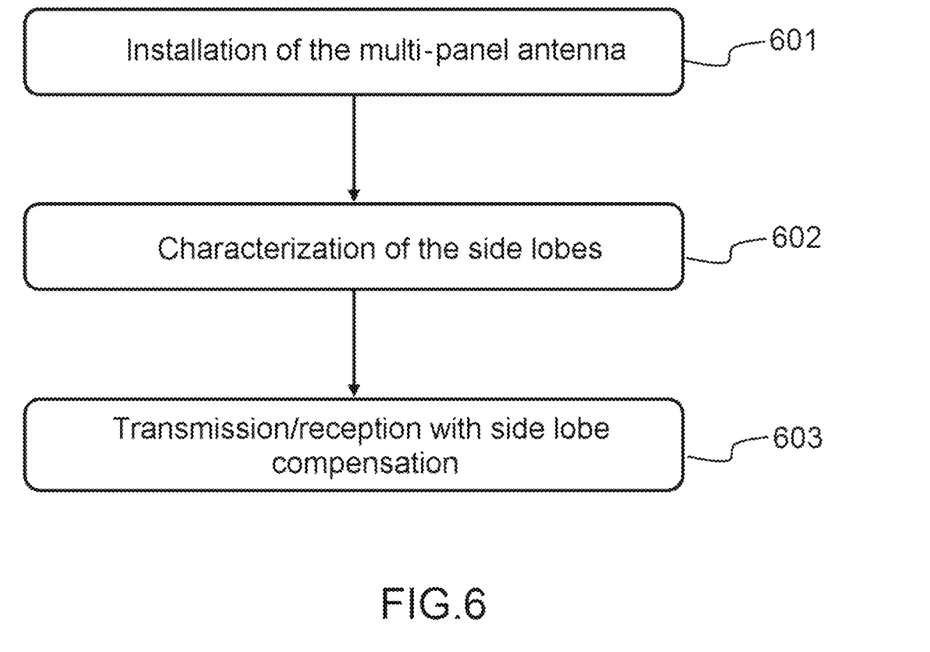
FIG. 6 represents the main steps of a method for the transmission or reception of an RF signal implemented from an array antenna according to an embodiment of the invention.

For this, in a first stage 601, N radiating panels are arranged side-by-side, horizontally, vertically or in both directions. The relative positions of the radiating panels, that is to say the differences between these various panels and their orientations, are recorded and stored in a memory. Advantageously, these positions can be obtained from measurements performed by metrology measurement equipment incorporated in the radar such as laser range finders.

In a second stage 602, the array antenna is configured to transmit an RF signal in a given pointing direction, preferably in an environment reproducing the propagation of the signal in free space, such as, for example, an anechoic chamber. The maximum gain of the antenna is oriented by shaping of the RF signal transmitted to each of the radiating elements, by considering an overall control law taking account of all of the array antenna. The radiation pattern of the antenna is then measured, in order to identify the direction of the side lobes generated by the differences between the radiating panels. The operation is repeated for each of the pointing directions envisaged in the operational context.

The characterization can also be performed by software. In this case, a model corresponding to the multiple-radiating-panel array antenna is constructed in digital simulation software implemented in order to measure the radiation pattern, and to identify the directions and levels of the side lobes associated with each pointing direction envisaged for the antenna.

After these two steps, the direction of the side lobes generated by the differences between radiating panels of the multiple-panel array antenna is known for the pointing directions envisaged. These directions are stored in a memory that allows access to it upon the implementation of the array antenna.

These two steps 601 and 602 can be reiterated for different arrangements of the radiating panels, by varying their number and/or their respective arrangements (positions and/or differences).

Figure 7:
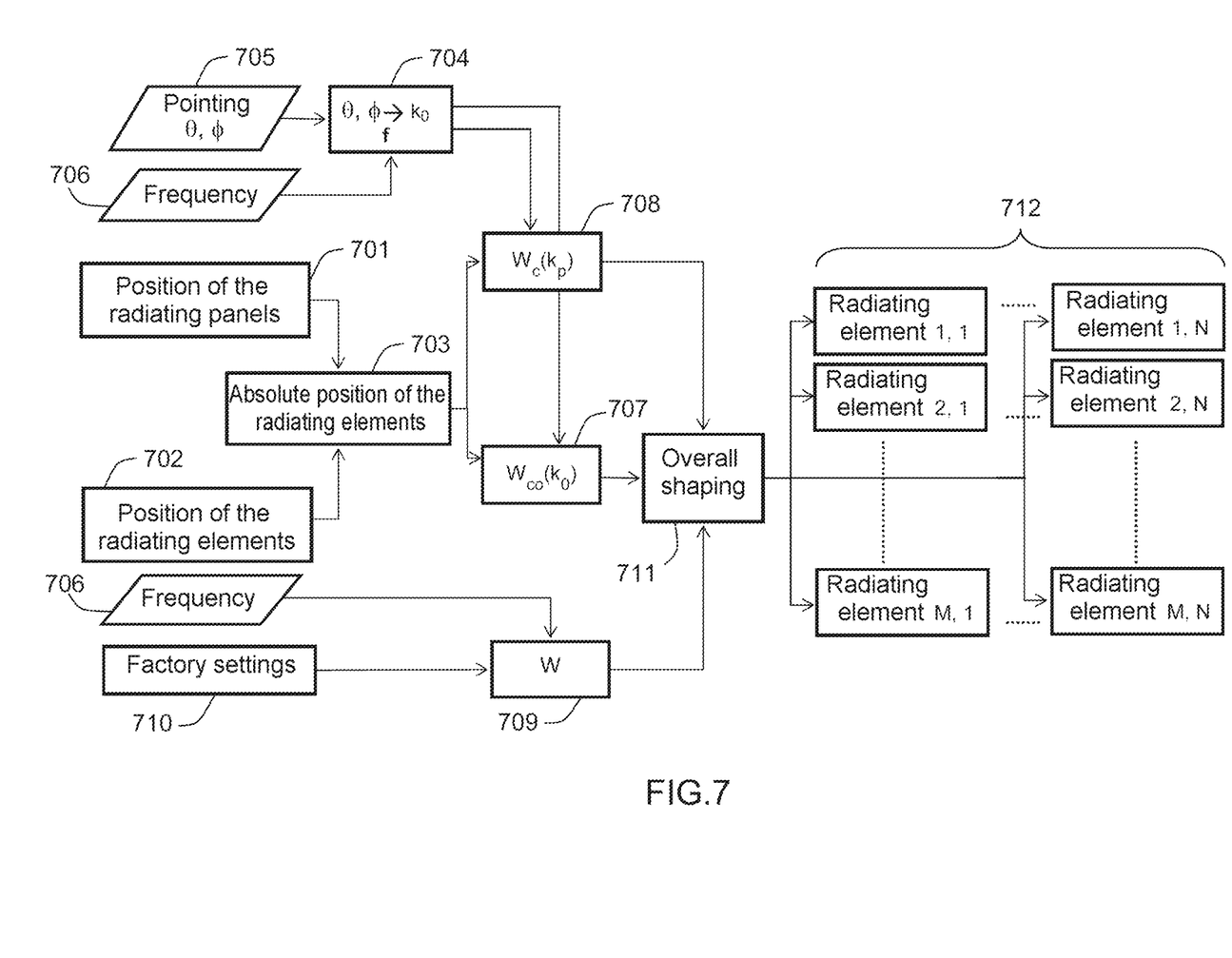
FIG. 7 illustrates in more detail the RF signal transmission/reception step of an embodiment of the method claimed.

The method also comprises a step 603 of implementation of the transmission and/or the reception of RF signals taking account of the position of the side lobes as a function of the disposition of the radiating panels. FIG. 7 represents in more detail this step of implementation of a transmission/reception method on a multiple-panel antenna according to an embodiment of the invention.

A centralized control law management device, such as the device 361 represented in FIG. 3, is configured to take account of the relative position 701 of the antenna panels and the position 702 of the radiating elements within each radiating panel to determine an absolute position 703 of each of the radiating elements within the array antenna. Operating parameters 704 are known to the centralized device, comprising an azimuth and an elevation that are desired for the pointing 705 of the beam of the antenna, and an operating frequency 706.

From the operating parameters 704 and from the position 703 of the radiating elements, the antenna management device is configured to calculate the control law that makes it possible to determine the set of coefficients $W_{co}$ 707 applicable to the array antenna to orient the beam from the antenna in the desired pointing direction, without taking account of the interferences generated by the use of different radiating panels.

The antenna management device is also configured to calculate the control law or laws to make it possible to determine the set of coefficients $W_c$ 708 applicable to the array antenna to attenuate the upturn of increases in linked side lobes due to the use of different radiating panels. These coefficients are calculated from information concerning the side lobes stored in memory in the step 602, selected as a function of the arrangement of radiating panels, of the pointing direction targeted and of the operating frequency of the antenna.

Advantageously, the antenna management device is also configured to retrieve from a memory a set of calibration coefficients W 709 corresponding to factory settings 710 associated with the radiating elements for the operating frequency 706.

The antenna management device is also configured to calculate an overall shaping coefficient 711 for each of the radiating elements, corresponding to the sum of the coefficient $\omega_{co}$ (derived from the set of coefficients $W_{co}$ 707) with the opposite of the P coefficients $\omega_c$ (derived from the set of coefficients $W_c$ 708), complemented if applicable by the associated calibration coefficient (derived from the set of coefficients W 709). Each overall shaping coefficient is used to shape the signals received from the corresponding radiating element 712 of the array antenna.

The processes 707, 708 and 711 of FIG. 7 are performed each time one of the operating parameters 704 is changed, such as the pointing direction of the antenna, the frequency or the number/arrangement 701 of the radiating panels.

In an advantageous embodiment, the coefficients $W_c$ corresponding to the shaping coefficients applicable to the radiating elements to reduce the level of the side lobes for each of the pointing directions considered, are calculated in the step 602 of characterization of the side lobes, then stored in a memory that allows access to it upon the implementation of the array antenna. The step 708 is then limited to the selection of the set of coefficients corresponding to the arrangement and operating parameters of the array antenna.

Advantageously, the same applies for the coefficients $W_{co}$ that have to be applied to each of the radiating elements to orient the maximum gain of the array antenna in the desired pointing direction without taking account of the interferences generated by the differences between the radiating panels, which simplifies the step 707.

Advantageously, the sets of shaping coefficients stored in memory correspond to the sum of the coefficient $W_{co}$ and of the opposite of the coefficient or coefficients $W_c$ for each radiating element of the antenna. This new set of coefficients is associated with parameters concerning the pointing direction, the frequency and the disposition of the radiating panels. Advantageously, the calibration coefficients W are also taken into account in the sum stored in memory in the step 602.

These alternative embodiments of the method according to the invention make it possible to reduce the load of real-time computations that have to be executed by the centralized RF signal shaping coefficient management device used to form the beams.

The array antenna that is the subject of the present invention is composed of a plurality of independent radiating panels linked to a centralized beam forming management device. It therefore well addresses the expressed need for ease of adaptation of the performance levels to the operational requirement since it is only necessary to add radiating panels to increase the size of the antenna and therefore improve its performance levels. It also well addresses the need for ease of transportation and deployment because the elements of which it is composed are mechanically independent, and can be transported independently. Finally, its complexity of implementation is low since the interferences generated by the different panels can be characterized and the shaping parameters calculated upstream, prior to the implementation of the antenna in the field of operations.

The invention claimed is:

1. An array antenna, comprising:
   a plurality of mechanically separate radiating panels arranged side-by-side, each radiating panel comprising a plurality of radiating elements,
   means for applying a shaping to radio frequency signals transmitted by or received from each radiating element, and
   a device for managing the radio frequency signal shaping application means, wherein the shaping application means are configured to apply, to the signal transmitted by or received from each radiating element, a complex shaping coefficient corresponding to a sum of at least:
   a shaping coefficient ($W_{co}$) making it possible to orient a maximum gain of the antenna in a given direction, and
   at least a negative of a shaping coefficient ($W_c$) making it possible to orient the maximum gain of the antenna in the direction of a side lobe resulting from differences between the radiating panels of the array antenna.

2. The array antenna as claimed in claim 1, wherein the sum used to calculate the shaping coefficient applied to the radiating elements further comprises a calibration coefficient (W).

3. The array antenna as claimed in claim 1, wherein the shaping coefficient ($W_{co}$) making it possible to orient the maximum gain of the antenna in a given direction is calculated from the desired pointing direction of the array antenna, from the frequency of the radio frequency signal, from the position of the radiating element considered within the array antenna, and from the total number of radiating elements of the array antenna.

4. The array antenna as claimed in claim 1, wherein the shaping coefficient ($W_c$) making it possible to orient the maximum gain of the antenna in the direction of at least one side lobe resulting from differences between the radiating panels of the array antenna is calculated from the direction of said side lobe, from the frequency of the radio frequency signal, from the position of the radiating element considered within the array antenna, and from the total number of radiating elements of the array antenna.

5. The array antenna as claimed in claim 1, used to receive a radio frequency signal, further comprising means for summing the signals received from each of the radiating elements and shaped.

6. A method for the transmission or reception of a radio frequency signal for an array antenna comprising a plurality of radiating panels arranged side-by-side, each radiating panel comprising a plurality of radiating elements, the method comprising the application of a complex shaping coefficient to the signal transmitted by or received from each radiating element, wherein said shaping coefficient corresponds to a sum of at least:
  a shaping coefficient making it possible to orient the maximum gain of the array antenna in a given direction, and
  at least a negative of a shaping coefficient making it possible to orient the maximum gain of the antenna in the direction of a side lobe resulting from differences between the radiating panels of the array antenna.

7. The method for the transmission or reception of a radio frequency signal as claimed in claim 6, further comprising a preliminary step of characterization of side lobes resulting from differences between the radiating panels of the array antenna.

* * * * *